No. 785,923. PATENTED MAR. 28, 1905.
J. A. TILDEN.
METER SYSTEM.
APPLICATION FILED OCT. 24, 1904.

2 SHEETS—SHEET 1.

Witnesses:

Inventor
James A. Tilden
Attorney

No. 785,923. PATENTED MAR. 28, 1905.
J. A. TILDEN.
METER SYSTEM.
APPLICATION FILED OCT. 24, 1904.
2 SHEETS—SHEET 2.
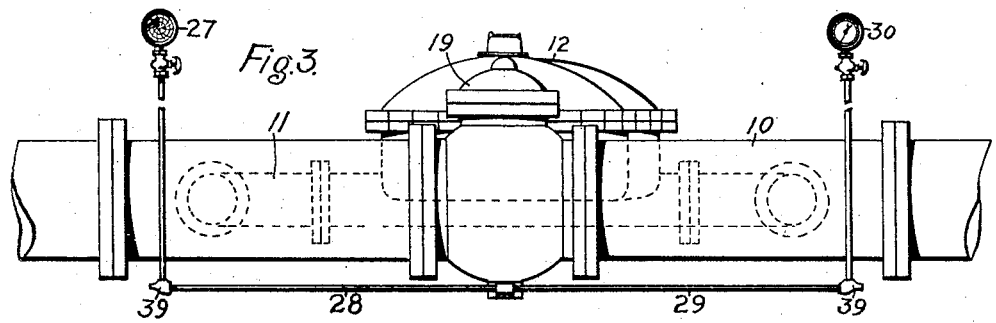
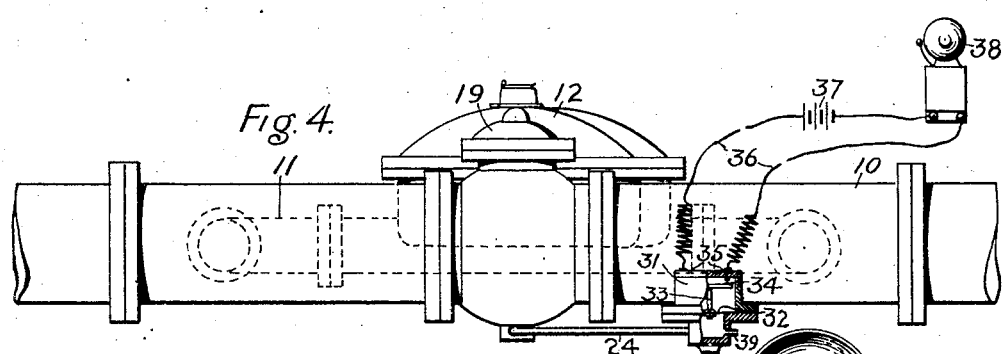
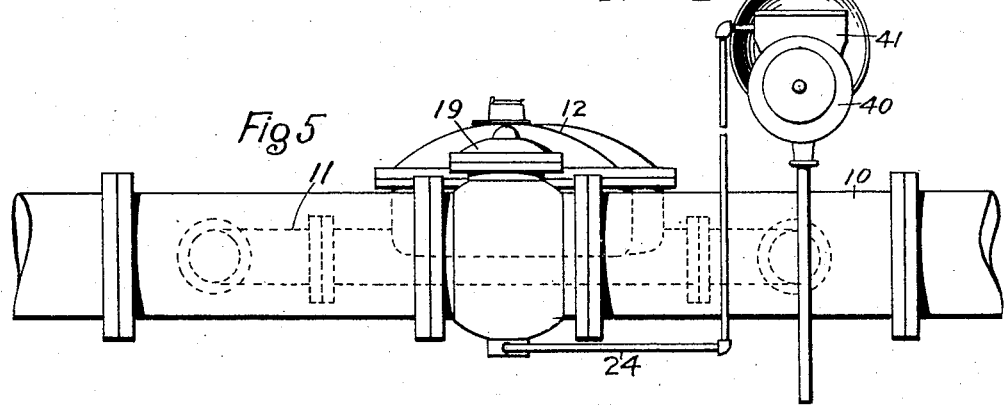
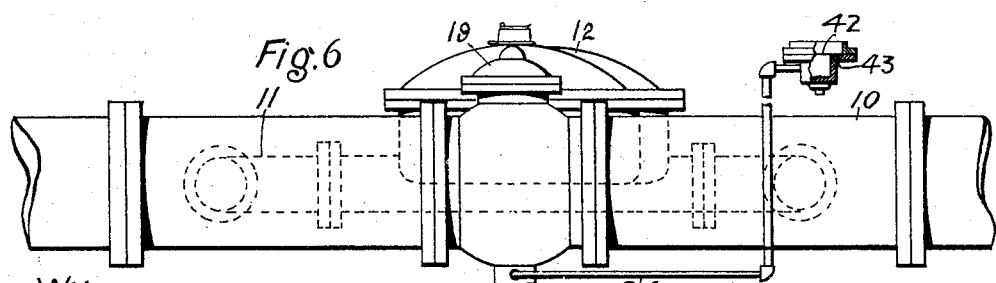
Witnesses:
Inventor
James A. Tilden
Attorney No. 785,923. Patented March 28, 1905.

UNITED STATES PATENT OFFICE.

JAMES A. TILDEN, OF HYDEPARK, MASSACHUSETTS, ASSIGNOR TO HERSEY MANUFACTURING COMPANY, OF SOUTH BOSTON, MASSACHUSETTS, A CORPORATION OF MAINE.

METER SYSTEM.

SPECIFICATION forming part of Letters Patent No. 785,923, dated March 28, 1905.

Application filed October 24, 1904. Serial No. 229,866.

*To all whom it may concern:*

Be it known that I, JAMES A. TILDEN, a citizen of the United States, residing at Hydepark, in the county of Norfolk and State of Massachusetts, have invented certain new and useful Improvements in Meter Systems, of which the following is a specification.

My invention relates to meter systems, and more particularly to those in which a plurality of conduits is provided for the passage of the fluid. Such organizations may comprise a main conduit of sufficient capacity to permit it to deliver the maximum flow—such, for example, as may be necessary to meet the extraordinary demands of fire-service and which it is not desired to obstruct by a measuring device, which main conduit has associated with it at some convenient point a by-pass adapted to properly transmit the ordinary flow and which contains a suitable meter for recording this. To render such an arrangement effective, it is necessary to place in the main conduit between the by-pass openings means for closing it under the normal conditions, and to provide such an apparatus which will operate with certainty upon a definite increase in the rate of flow, and which will further give an indication of its operation, are the principal objects of my invention.

Figure 1:
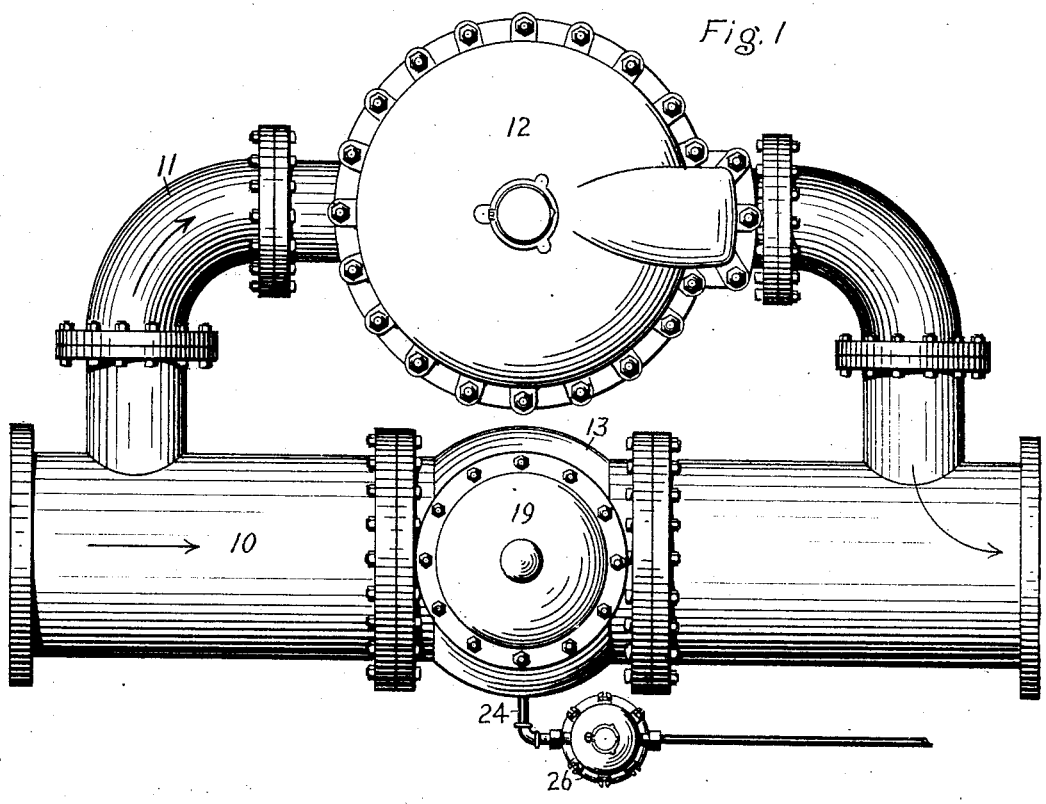
Figure 2:
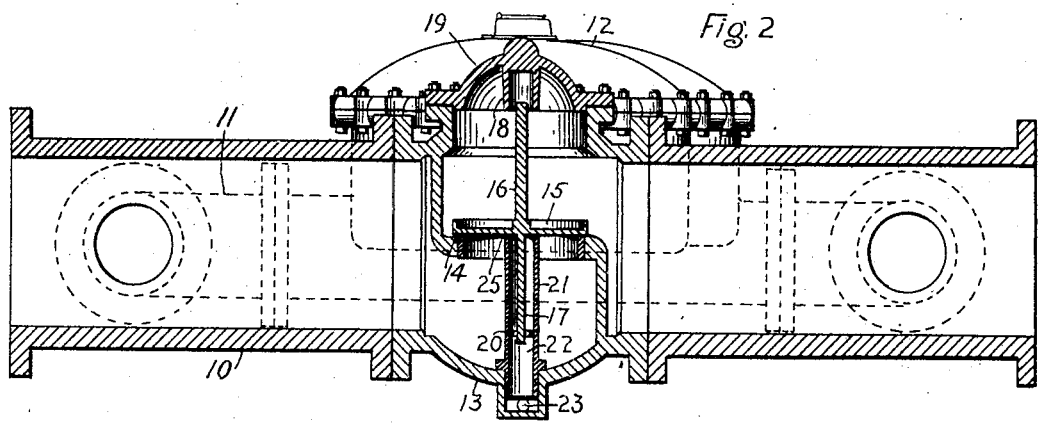

Figure 1 is a top plan view of a meter system embodying one form of my invention. Fig. 2 is a central vertical longitudinal section through the main conduit, and Figs. 3, 4, 5, and 6 are side elevations illustrating other forms of my invention.

Similar characters of reference indicate like parts throughout the several figures of the drawings.

10 designates a main conduit, the diameter of which is sufficient to enable it to convey without undue resistance the greatest fluid-flow which it may be desired to supply. Opening from this is a by-pass conduit 11, the capacity of which is such as to satisfactorily provide for the normal supply, and in this by-pass is situated a meter 12 of any desired type. In the main conduit between the by-pass openings is a section 13, containing a seat 14, surrounding an opening of the proper area and which is here shown as horizontally disposed. With this seat coacts a controlling device or valve 15, having extending from its opposite sides stems 16 and 17. The former may be retained against excessive lateral movement by a socket 18, formed upon the under side of a removable cap 19 for the section 13, said cap giving access to the valve. The stem 17 may be similarly guided by a spider 20, situated within a chamber 21, conveniently of cylindrical form and rising from the bottom of the section at the side of the valve toward the induction-opening of the by-pass. This chamber furnishes a passage 22, preferably connected with the atmosphere through a contracted opening at 23, into which is made a pipe 24. The inner opening of this chamber or passage is controlled by the valve, which preferably contacts simultaneously with both its seat and the inner extremity 25 of the chamber. To permit the valve to readily adjust itself to the surfaces with which it contacts, the fit of the stems 16 and 17 in the guides is made free, giving some lateral play.

With the pipe 24 is connected an indicator which may be in the form of recording mechanism, this being shown in the present instance as a meter 26.

The ratio of the area of the valve-opening comprised within the seat and the area of the chamber or passage opening may be predetermined and bear some definite relation to the fluid-head in the system, so that there will be an excess of pressure of the desired magnitude upon the upper side of the valve or that toward the eduction-opening of the by-pass, which will be proportional to excess of effective area, and this under static conditions will be wholly exerted to hold the valve upon its seat and the main conduit closed. This closure will be maintained during a flow through the system until the rate increases to such an extent (as from the draft of fire-service) that the loss of head through the by-pass destroys the excess of pressure. At the moment the loss of head equals the pressure upon the valve resulting from the difference in effective area said valve is in a state of unstable equilibrium, when the slightest increase in the rate of flow causes it to instantly rise and establish a free passage through the main conduit. The lift of the valve simultaneously opens the chamber 21, and a limited flow occurs through the pipe 24, indicating the existence of the new condition of the system. By having in this pipe a properly-calibrated meter, the area of the opening 23 being known, this indication will become a record of the length of time that the valve was open.

Instead of a meter, as has just been described, any other convenient indicator may be employed. At the left of Fig. 3 a registering-gage 27 is shown as connected by a pipe 28 with the opening 23, this recording the time at which the condition of the pressure in the passage in excess of that of the atmosphere was inaugurated. Leading from the opening 23 is also shown a pipe 29, communicating with an ordinary pressure-gage 30. This furnishes a visible signal, but not a record. It will be obvious that these gages may be placed in any position where their particular indication will most effectively inform the observers.

In Fig. 4 the pipe 24 is illustrated as leading to a chamber 31, across which extends a flexible diaphragm 32. This diaphragm supports a stem 33, extending upwardly from it and having at its extremity a contact member 34. The contact member coacts with suitable insulated fixed contacts 35 35, from which lead a circuit 36, containing some suitable source of electrical energy, as a battery 37, and an audible signal, which may be in the form of an electric bell 38. In the arrangement just described and also that illustrated in Fig. 3 the indicators associated with the outlets from the chambers do not supply communication with the atmosphere, and to provide for this contracted vents 39 are preferably furnished, leading from the chambers, pipes, or indicators.

Fig. 5 shows an audible signal in the form of a bell 40, which has associated with it for its operation a hydraulic motor 41, supplied by the flow through the pipe 24. In Fig. 6 a visible indication is furnished by a frangible diaphragm 42, extending across the open end of a chamber 43, in which the pipe 24 terminates. This diaphragm is ruptured when the pressure in the system is applied to it by the opening of the valve.

In any case it will be seen that flows properly transmitted by the meter-conduit are confined thereto and measured, while for abnormal demands upon the system a free passage is furnished through the main conduit, this becoming effective at any desired point in the increase of velocity and operating promptly and in a reliable manner, and that an indication or record is at the same time furnished, serving to give interested persons information of the occurrence or extent of this increased flow.

Having thus described my invention, I claim—

1. A meter system comprising a main conduit, a by-pass opening therefrom, a meter in the by-pass, and a valve in the main conduit between the by-pass openings, the conduit having a passage open to the atmosphere and controlled by the movement of the valve.

2. A meter system comprising a main conduit, a by-pass opening therefrom, a meter in the by-pass, and a valve in the main conduit between the by-pass openings, the conduit having a passage open to the atmosphere and with which the valve coacts.

3. A meter system comprising a main conduit, a by-pass opening therefrom, a meter in the by-pass, and a valve in the main conduit between the by-pass openings, the conduit having a passage open to the atmosphere and with which the valve coacts at the side toward the induction-opening of the by-pass.

4. A meter system comprising a main conduit, a by-pass opening therefrom, a controlling device in the main conduit between the by-pass openings, means for normally maintaining an excess of fluid-pressure upon one side of the controlling device, and an indicator under the influence of the controlling device.

5. A meter system comprising a main conduit, a by-pass opening therefrom, a meter in the by-pass, a valve in the main conduit between the by-pass openings, the conduit having a passage open to the atmosphere and controlled by the movement of the valve, and an indicator connected with the passage.

6. A meter system comprising a main conduit, a by-pass opening therefrom, a meter in the by-pass, a valve in the main conduit between the by-pass openings, the conduit having a passage open to the atmosphere and controlled by the movement of the valve, and mechanism connected with the passage and furnishing an indication after the flow through said passage has ceased.

7. A meter system comprising a main conduit, a by-pass opening therefrom, a controlling device in the main conduit between the by-pass openings, the conduit having a passage open to the atmosphere and under the influence of the controlling device, and indicating mechanism connected with the passage.

8. A meter system comprising a main conduit, a by-pass opening therefrom, a meter in the by-pass, a valve in the main conduit between the by-pass openings, the conduit having a passage open to the atmosphere and with which the valve coacts at the side toward the induction-opening of the by-pass, and indicating mechanism connected with the passage.

9. A meter system comprising a main conduit, a by-pass opening therefrom, a meter in the by-pass, a valve in the main conduit between the by-pass openings, and a chamber in the conduit with which the valve coacts at the side toward the induction-opening of the by-pass.

10. A meter system comprising a main conduit, a by-pass opening therefrom, a meter in the by-pass, a valve in the main conduit between the by-pass openings, a chamber in the conduit with which the valve coacts, and a meter connected with the chamber.

11. A meter system comprising a main conduit, a by-pass opening therefrom, a meter in the by-pass, a valve in the main conduit between the by-pass openings, the conduit having a passage open to the atmosphere and with which the valve coacts, and a meter connected with the passage.

Signed at Boston, in the county of Suffolk and State of Massachusetts, this 19th day of October, 1904.

JAMES A. TILDEN.

Witnesses:
HENRY D. WINTON,
FRANCIS C. HERSEY, Jr.